(12) United States Patent
Koral et al.

(10) Patent No.: US 12,160,445 B2
(45) Date of Patent: Dec. 3, 2024

(54) CORRELATING COMPROMISED HOME INTERNET OF THINGS DEVICES WITH DISTRIBUTED DENIAL OF SERVICE ATTACKS

(71) Applicant: AT&T Intellectual Property I, L.P., Atlanta, GA (US)

(72) Inventors: Yaron Koral, Cherry Hill, NJ (US); Shraboni Jana, Danville, CA (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 179 days.

(21) Appl. No.: 17/724,112

(22) Filed: Apr. 19, 2022

(65) Prior Publication Data
US 2023/0336585 A1   Oct. 19, 2023

(51) Int. Cl.
*H04L 9/40* (2022.01)
*G16Y 30/10* (2020.01)

(52) U.S. Cl.
CPC ...... *H04L 63/1458* (2013.01); *H04L 63/0209* (2013.01); *G16Y 30/10* (2020.01); *H04L 2463/141* (2013.01)

(58) Field of Classification Search
CPC ............ H04L 63/1458; H04L 63/0209; H04L 2463/141; G16Y 30/10
See application file for complete search history.

(56) References Cited

U.S. PATENT DOCUMENTS

| 11,050,785 | B2 * | 6/2021 | Konda | .................. H04L 41/12 |
| 2019/0182266 | A1 * | 6/2019 | Doron | .................. H04L 63/145 |
| 2022/0263861 | A1 * | 8/2022 | Marozas | ............... G06F 21/552 |

* cited by examiner

*Primary Examiner* — Azizul Choudhury
(74) *Attorney, Agent, or Firm* — Hartman & Citrin LLC

(57) ABSTRACT

A distributed denial of service ("DDoS") attack profiler can determine a plurality of DDoS attack properties associated with a DDoS attack that utilizes an Internet of Things ("IoT") device operating in communication with a home gateway. The DDoS attack profiler can create a DDoS attack profile and can provide a DDoS attack report based upon the DDoS attack profile to a correlator. An IoT device profiler can determine a plurality of IoT device properties and can create, based upon the plurality of IoT device properties, an IoT device profile. The IoT device profiler can create an anomaly report that identifies an anomaly associated with the IoT device. The correlator can correlate the DDoS attack report with the anomaly report to determine if a match exists. In response to determining that the match exists, the home gateway system can store the bot match record in a bot match repository.

20 Claims, 14 Drawing Sheets

CORRELATING COMPROMISED HOME INTERNET OF THINGS DEVICES WITH DISTRIBUTED DENIAL OF SERVICE ATTACKS

BACKGROUND

The Internet of Things ("IoT") market has a vast number of vendors and is highly unstandardized. IoT devices that provide the same basic functions may operate on different operating systems and software environments. Others may provide little to no after sale support, including crucial security updates to patch security vulnerabilities. The low cost of IoT device components and potential profits have spurred many fly-by-night vendors that disappear without notice, leaving their customers with at-risk IoT devices. As a result, it is challenging to implement antivirus, antimalware, and other security solutions for the IoT market.

IoT devices are a primary target for bot-harvesting to cybercriminals and botnet operators. Botnets are a thriving economic engine and are in constant growth. Home IoT devices are commonly used as bots in many botnets today. However, current security solutions focus on protecting against distributed denial of service ("DDoS") attack victims, but neglect the infected endpoints that are used as bots. The home network also suffers because the IoT devices that belong to it participate in the DDoS attack. This activity consumes the home network bandwidth and sometimes may incur high bills for the customer. This problem becomes significant considering that there are hundreds of DDoS attacks every day and the average duration of such an attack is around four hours. Furthermore, it is very likely that a single vulnerable device was infected and acts as a bot for several botnets, which means it will participate in several DDoS campaigns per day. Also, botnet operators may decide to use their bots to harvest cryptocurrency, which causes other problems to the home IoT device that now consumes much more energy and usually malfunctions when it is harvesting. Current countermeasures focus on protecting the target of a botnet attack. For example, if a botnet launches a DDoS attack over a hospital or a financial institution, the current solutions protect the target and identify the attack method. However, there are no solutions that try to identify and protect the infected devices.

SUMMARY

Concepts and technologies disclosed herein are directed to correlating compromised home IoT devices with DDoS attacks. According to one aspect of the concepts and technologies disclosed herein, a home gateway system can include a processor and a memory. The memory can include instructions that, when executed by the processor, cause the processor to perform operations. More particularly, in response to a DDoS attack, a DDoS attack profiler can determine a plurality of DDoS attack properties for the DDoS attack. The DDoS attack utilizes an IoT device operating in communication with the home gateway system. The DDoS attack profiler can create, based upon the DDoS properties, a DDoS attack profile for the DDoS attack. The DDoS attack profiler can provide a DDoS attack report to a correlator. The DDoS attack report can be based upon the DDoS attack profile. An IoT device profiler executed by the home gateway system can determine a plurality of IoT device properties for the IoT device. The IoT device profiler can create, based upon the plurality of IoT device properties, an IoT device profile for the IoT device. The IoT device profiler can provide an anomaly report to an anomalies repository. The anomaly report can identify an anomaly associated with the IoT device. The IoT device profiler can provide an anomaly report to an anomalies repository. The anomaly report can identify an anomaly associated with the IoT device. The anomaly associated with the IoT device can be indicative of an abnormality among at least one of the plurality of IoT device properties. The correlator can receive the DDoS attack report from the DDoS attack profiler and the anomaly report from the anomalies repository. The correlator can correlate the DDoS attack report with the anomaly report to determine if a match exists. In response to determining that the match exists, the home gateway system can store the bot match record in a bot match repository.

In some embodiments, the plurality of DDoS attack properties can include a volume property, a time/duration property, a packet type property, a source rotation property, a profiling method property, and a devices in use property. The volume property can indicate an expected utilization and bandwidth of a single bot (i.e., a compromised IoT device). The time/duration property can help correlate traffic logs to the time of a DDoS attack. Some DDoS attacks may continue for an extended period of time that exceeds days or weeks. In this case, the DDoS attack can be reported with a start time and an indication that the attack is ongoing. For such attacks, the DDoS attack profiler can generate periodic reports continuously until the attack ends. The packet type property indicates the type(s) of packets the DDoS attack uses. The DDoS attack may use Transfer Control Protocol ("TCP"), User Datagram Protocol ("UDP"), Internet Control Message Protocol ("ICMP"), or a combination thereof. For example, if the DDoS attack is mainly UDP packets, the home gateway can look for abnormal streams of UDP packets. Other protocol types are contemplated. The source rotation property indicates if the botnet operators used the same bots during the DDoS attack or rotated a set of bots. For example, some botnet operators start with one set of bots and change to a fresh set of bots after a while. The reason for this is that defenders may block the original attacking bots, so a new set is used to circumvent this defense. The profiling method property classifies the DDoS attack, if possible, to a set of known methods. For example, the set of known methods can include UDP flood, ping flood, SYN flood, ping of death, domain name system ("DNS") reflection, network time protocol ("NTP") amplification, and the like. This classification can further help the home gateways to identify compromised IoT devices that participate in a DDoS attack. A property of the device(s) in use can be made available for cases in which the DDoS attack utilizes a certain vulnerable set of devices. For example, past DDoS attacks may indicate a reliance on a certain brand or model of IoT device (e.g., a certain brand of a security camera).

In some embodiments, the plurality of IoT device properties can include an average data volume property, a daily patterns property, and a protocols in use property. For example, an average intelligent door lock may generate a volume of less than 1 KB per hour (i.e., average volume property is equal to 1 KB/hour), is active mainly during morning and afternoon hours (i.e., the daily patterns property identifies these hours), and operates only on UDP port 32323 (i.e., the protocols in use property indicates UDP as in use).

In some embodiments, the IoT device profiler can observe a maintenance event, such as a software or firmware update to the IoT device. The IoT device profiler can update the IoT device profile based upon the maintenance event.

In some embodiments, the home gateway system can provide a bot match report to a bot report aggregator. The bot match report can include at least the bot match record. The bot report aggregator can aggregate the bot match report from the bot match repository associated with the home gateway and a plurality of bot match records from a plurality of bot match repositories associated with a plurality of home gateways. The bot report aggregator can track a plurality of DDoS attacks, including the DDoS attack that utilizes the IoT device, based, at least in part, upon the bot match report and the plurality of bot match reports. The bot report aggregator can identify a shared set of bots (i.e., botnets) that participated in different DDoS attacks.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
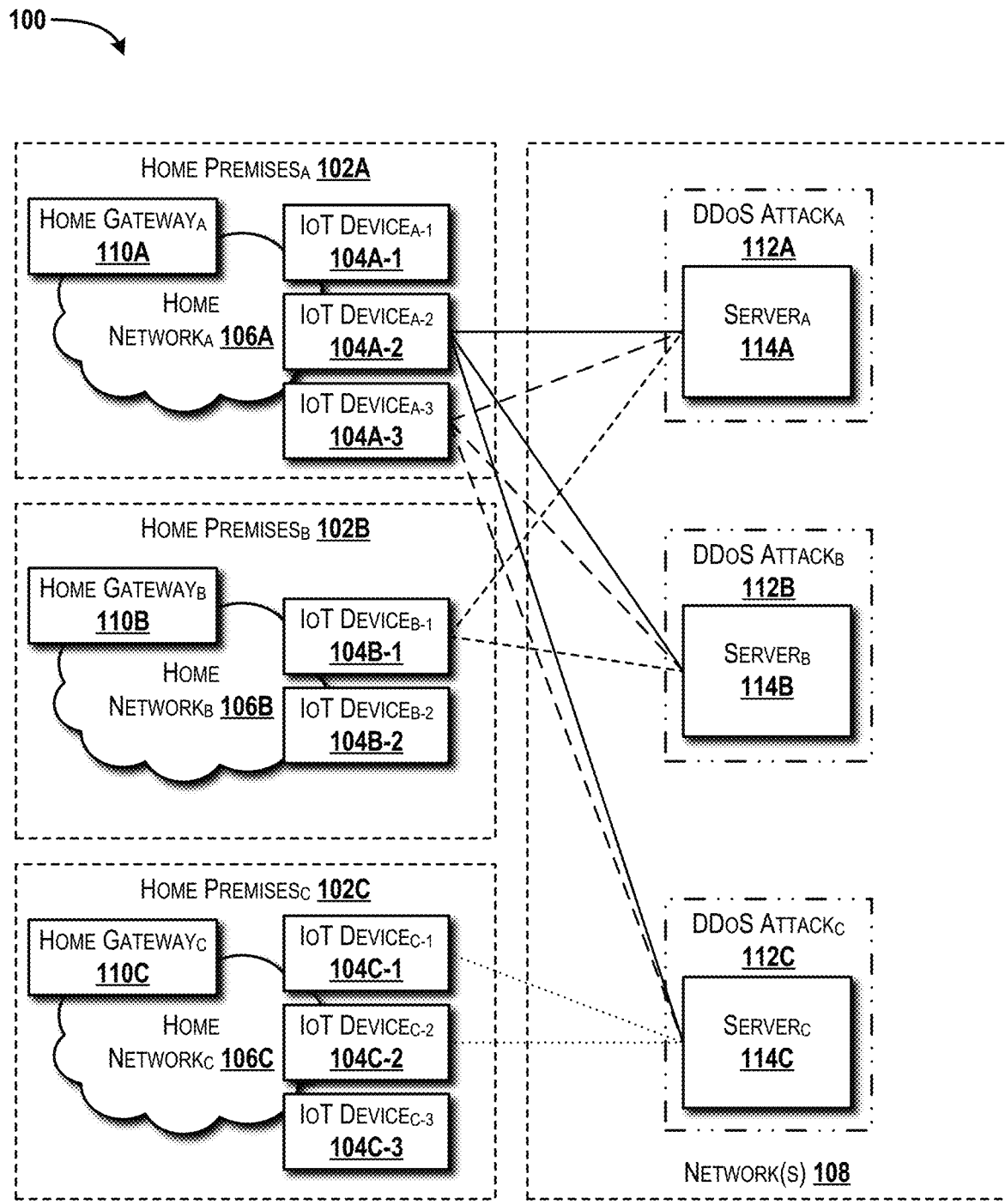
FIG. 1 is a block diagraming illustrating aspects of an operating environment in which aspects of the concepts and technologies disclosed herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for correlating compromised home IoT devices with DDoS attacks will be described.

IoT devices do not have built-in protection for DDoS attacks. The concepts and technologies disclosed herein address this limitation via a malware identification method that uses network visibility and does not require installation on the device itself. A novel aspect of the invention is the ability to identify infected home IoT devices by combining carrier-grade visibility of both the Internet and residential gateways. The correlation of these views allows matching Internet DDoS occurrences with local in-home abnormal device behavior. By observing multiple DDoS attacks over time, the concepts and technologies disclosed herein can identify infected home IoT devices that participate in a DDoS attack and can determine that the home IoT devices are bots without having to install any software on the devices themselves, thus reducing operational costs. The concepts and technologies disclosed herein therefore provide a valuable service, the value of which is expected to grow due, at least in part, to the following reasons. Botnets are a thriving economic engine. As of 2022, roughly 280 million bots login daily and this number is expected to grow. Another reason is the variety and number of IoT devices available to consumers and the persistent innovation in the IoT industry with frequent introductions of new IoT devices. Also, the increased reliance on remote work and the rise of unconventional professions, such as professional gamers, video streamers, and the like, have increased the overall usage of the home network environment and, as a result, has garnered the interest of DDoS attackers.

Turning now to FIG. 1, a block diagram illustrating aspects of an operating environment 100 in which aspects of the concepts and technologies disclosed herein can be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 illustrates a first home premises ("home premises$_A$") 102A that includes a first set of IoT devices ("IoT device$_{A-1}$ through IoT device$_{A-3}$") 104A-1-104A-3 operating on and in communication with a first home network ("home network$_A$") 106A that, in turn, can communicate with one or more networks 108, such as one or more Internet service provider ("ISP") network(s) and/or the Internet, via a first home gateway ("home gateway$_A$") 110A; a second home premises ("home premises$_B$") 102B that includes a second set of IoT devices ("IoT device$_{B-1}$ through IoT device$_{B-2}$") 104B-1-104B-2 operating on and in communication with a second home network ("home network$_B$") 106B that, in turn, can communicate with the network(s) 108 via a second home gateway ("home gateway$_B$") 110B; and a third home premises ("home premises$_C$") 102C that includes a third set of IoT devices ("IoT device$_{C-1}$ through IoT device$_{C-3}$") 104C-1-104C-3 operating on and in communication with a third home network ("home network$_C$") 106C that, in turn, can communicate with the network(s) 108 via a third home gateway ("home gateway$_C$") 110C. At least a portion of the first, second, and third sets of IoT devices (collectively "IoT devices 104") are compromised and being used to execute at least a portion of one or more DDoS attacks 112A-112C on one or more servers 114A-114C. In particular, the IoT device$_{A-2}$ 104A-2 is being used to execute at least a portion of a first DDoS attack ("DDoS attack$_A$") 112A on a first server ("server$_A$") 114A, at least a portion of a second DDoS attack ("DDoS attack$_B$") 112B on a second server ("server$_B$") 114B, and at least a portion of a third DDoS attack ("DDoS attack$_C$") 112C on a third server ("server$_C$") 114C; the IoT device$_{A-3}$ 104A-3 is being used to execute at least a portion of the DDoS attack$_A$ 112A on the server$_A$ 114A, at least a portion of the DDoS attack$_B$ 112B on the server$_B$ 114B, and at least a portion of the DDoS attack$_C$ 112C on a server$_C$ 114C; the IoT device$_{B-1}$ 104B-1 is being used to execute at least a portion of the DDoS attack$_A$ 112A on the server$_A$ 114A and at least a portion of the DDoS attack$_B$ 112B on the server$_B$ 114B; the IoT device$_{C-1}$ 104C-1 is being used to execute at least a portion of the DDoS attack$_C$ 112C on the server$_C$ 114C; and the IoT device$_{C-2}$ 104C-2 is being used to execute at least a portion of the DDoS attack$_C$ 112C on the server$_C$ 114C. The illustrated example should not be construed as being limiting in any way.

The term "home" is used herein to broadly encompass a location in which a user (not shown) resides at least part time. As such, the home premises 102A-102C can be a primary residence, a secondary residence, an office or other place of business, or any other location that the user defines as their "home."

The IoT devices 104 can communicate directly with the home networks 106 (e.g., via an on-board ethernet and/or WI-FI component). The IoT devices 104 additionally or alternatively can communicate with the home networks 106 through a hub device (not shown), which can communicate with the IoT device(s) 104 via a wireless technology such as Institute of Electrical and Electronics Engineers ("IEEE") 802.111.1 (commonly known as BLUETOOTH low energy or BLE), IEEE 802.11ah (HaLow), BLUETOOTH, ZIG-BEE, Z-WAVE, other short-range communications technologies, other IoT-specific technologies, combinations thereof, and the like. The IoT devices 104 can communicate with each other using the same or similar technologies as those described above. It should be understood that as IoT technologies continue to mature, new communications protocols likely will be developed and improve upon existing technologies. The concepts and technologies disclosed herein are not limited to any particular technology(ies). Accordingly, the example technologies described herein should not be construed as being limiting in any way.

The home networks 106 can be or can include one or more local area networks ("LANs"), including one or more wireless LANs ("WLANs") and/or one or more wired/fixed LANs (e.g., ethernet). The home networks 106 can communicate with the network(s) 108 via the home gateways 110. The network(s) 108 can be or can include one or more fixed broadband communications networks implemented via fiber optic, coaxial cable, digital subscriber line ("DSL"), broadband over power lines, a combination thereof, and/or the like. The network(s) 108 can be or can include one or more wireless communications networks implemented using one or more wireless technologies disclosed herein. The network(s) 108 also can include the Internet through which the IoT device(s) 104 can access one or more services. The home gateways 110 can be or can include a modem that enables connectivity to the network(s) 108. The home gateways 110 additionally can provide other functionality such as routing, switching, and the like for the home networks 106. Aspects of the home gateways 110 can be enabled via firmware, software, hardware, or some combination thereof. In some embodiments, the home gateways 110 operate as standalone devices that are in communication with an existing modem, router, switch, or other network device. In some other embodiments, the home gateways 110 operate as piggyback devices that communicate directly with an existing modem, router, switch, or other network device. The home gateways 110 alternatively may be proprietary devices that provide the functionality described herein.

The IoT devices 104 can include one or more smart home devices such as thermostats, lights, cameras, security devices, smoke alarms, carbon monoxide alarms, locks, appliances, and the like. An example IoT device 1000 is illustrated and described herein with reference to FIG. 10. The IoT devices 104 can access one or more IoT services, which can support the operation of the IoT device(s) 104. For example, the IoT service(s) can enable device setup, device registration, remote monitoring, remote control, and/or other interactions with the IoT device(s) 104. In some embodiments, the IoT service(s) can be accessed via a user device (not shown), which can execute a corresponding client application to enable the aforementioned functionality. For example, an IoT device 104 embodied as a smart thermostat may communicate with an IoT service to obtain temperature, humidity, and/or other settings to enable the user to view and manage these settings from a remote device such as a user device. Those skilled in the art will appreciate that IoT services can include any services utilized, at least in part, by the IoT device(s) 104. Accordingly, any example services described herein should not be construed as being limiting in any way.

The servers 114 can host one or more websites that each can provide one or more services. For example, the servers 114 can provide an online shopping service via an online store website or a video streaming service via a video streaming website and compatible client applications. The servers 114 can host content such as video, audio, games, and/or the like. The servers 114 can host one or more databases. The servers 114 can operate as part of a data center. The service(s) provided, at least in part, by the servers 114 are inconsequential to the operations of the concepts and technologies described herein. As such, those skilled in the art will appreciate the servers 114 can be used, at least in part, to provide any type and/or number of services that can be the target of one or more DDoS attacks 112.

In the illustrated example, the DDoS attacks 112A-112C took place at different times. Correlating these times and other properties with abnormal behavior of IoT devices 104 shows that two of the IoT devices 104A-2, 104A-3 operating in the home premises$_A$ 102A are connected to all three DDoS attacks 112A-112C. The IoT device$_{B-1}$ 104B-1 operating in the home premises$_B$ 102B participated in two DDoS attacks 112A, 112B. Two of the IoT devices 104C-1, 104C-2 operating in the home premises$_C$ 102C participated in the DDoS attack 112C. After further analysis (detailed below), it appears that the same botnet infrastructure attacked the server$_A$ 114A and the servers 114B, which leads to the conclusion that the IoT devices 104 in the home premises$_A$ 102A and the home premises$_B$ 102B belong to this botnet infrastructure. A second botnet infrastructure attacked the server$_C$ 114C. This second botnet infrastructure has control of two IoT devices 104C-1, 104C-2 in the home premises$_C$ 102C and two IoT device 104A-2, 104A-3 in the home premises$_A$ 102A.

Each of the DDoS attacks 112 can utilize at least a portion of the IoT devices 104. The DDoS attacks 112 can utilize other devices (not shown) in addition to the IoT devices 104. DDoS attacks are well-known in the art. Accordingly, additional details about how a DDoS attack is carried out will not be described herein.

Figure 2:
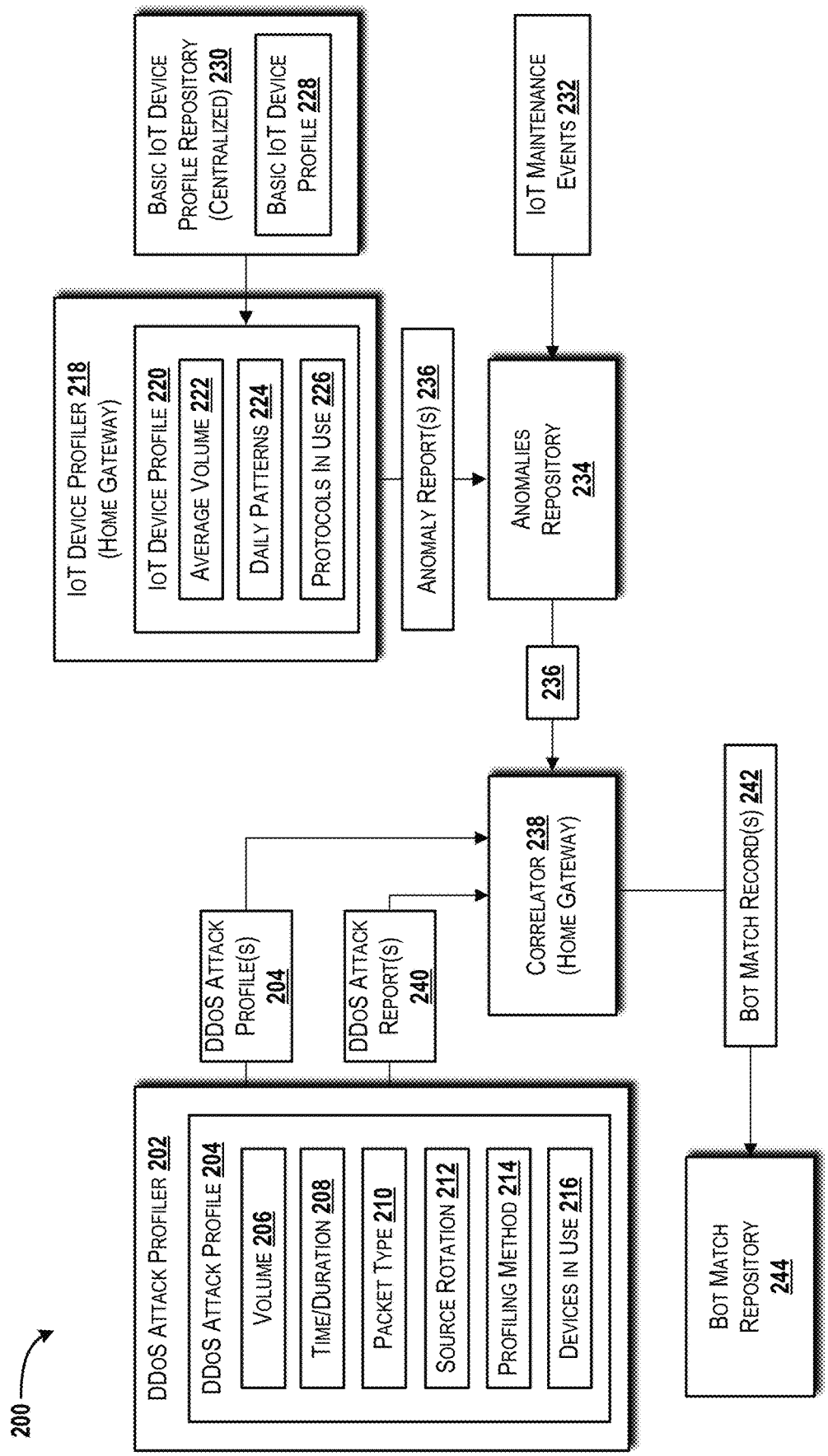
FIG. 2 is a block diagram illustrating elements of a DDoS attack correlation system, according to an illustrative embodiment of the concepts and technologies disclosed herein.

Turning now to FIG. 2, a block diagram illustrating elements of a DDoS attack correlation system 200 will be described, according to an illustrative embodiment. The DDoS attack correlation system 200 includes elements operating within the home gateways 110 and elements operating as part of a service provider environment (e.g., a cloud environment of an ISP or carrier). In particular, the service provider environment can include a DDoS attack profiler 202 that produces a DDoS attack profile 204 for each DDoS attack 112 and sends the DDoS attack profile 204 to each of the home gateways 110. In some embodiments, each of the home gateways 110 includes a corresponding device-side DDoS attack profiler (not shown) that can receive the DDoS attack profile 204 from the DDoS attack profiler 202. The DDoS attack profiler 202 can utilize an existing profiling method to generate the DDoS attack profile 204. The DDoS attack profiler 202 can perform the profiling method locally. The DDoS attack profiler 202 can utilize a remote system to perform the profiling method. The illustrated DDoS attack profile 204 includes the following properties: a volume property ("volume") 206, a time/duration property ("time/duration") 208, a packet type property ("packet type") 210, a source rotation property ("source rotation") 212, a profiling method property ("method") 214, and a device(s) in use property ("devices in use") 216. It is contemplated that the DDoS attack profile 204 may be customized to the needs of a given implementation to include additional and/or alternative properties than those described herein. As such, the illustrated DDoS attack profile 204 and its associated properties 206-216 should not be construed as being limiting in any way.

The volume property 206 can indicate an expected utilization and bandwidth of a single bot (i.e., a compromised IoT device 104). If the volume is low (e.g., 10-30 Kbps), it may be more challenging for the home gateways 110 to identify conclusively if one of the IoT devices 104 participated in a DDoS attack 112. On the other hand, the home gateways 110 should expect to identify one or more of the IoT devices 104 as bots within the home networks 106 or decide that none of the IoT devices 104 participated in the attack if the volume is high.

The time/duration property 208 can help correlate traffic logs to the time of a DDoS attack 112. Some DDoS attacks 112 may continue for an extended period of time that exceeds days or weeks. In this case, the DDoS attack 112 can be reported with a start time and an indication that the attack is ongoing. For such attacks, the DDoS attack profiler 202 can generate periodic reports continuously until the attack ends.

The packet type property 210 indicates the type(s) of packets the DDoS attack 112 uses. The DDoS attack 112 may use Transfer Control Protocol ("TCP"), User Datagram Protocol ("UDP"), Internet Control Message Protocol ("ICMP"), or a combination thereof. For example, if the DDoS attack 112 is mainly UDP packets, the home gateway can look for abnormal streams of UDP packets. Other protocol types are contemplated.

The source rotation property 212 indicates if the botnet operators used the same bots during the DDoS attack 112 or rotated a set of bots. For example, some botnet operators start with one set of bots and change to a fresh set of bots after a while. The reason for this is that defenders may block the original attacking bots, so a new set is used to circumvent this defense.

The profiling method property 214 classifies the DDoS attack 112, if possible, to a set of known methods. For example, the set of known methods can include UDP flood, ping flood, SYN flood, ping of death, domain name system ("DNS") reflection, network time protocol ("NTP") amplification, and the like. This classification can further help the home gateways 110 to identify compromised IoT devices 104 that participate in a DDoS attack 112.

The device(s) in use property 216 can be made available for cases in which the DDoS attack 112 utilizes a certain vulnerable set of devices. For example, past DDoS attacks 112 may indicate a reliance on a certain brand or model of IoT device 104 (e.g., a certain brand of a security camera).

Each of the home gateways 110 also can include an IoT device profiler 218 that monitors traffic patterns of the IoT devices 104 to create an IoT device profile 220. The IoT device profile 220 can include the following properties: an average data volume property ("average volume") 222, a daily patterns property ("daily patterns") 224, and a protocols in use property ("protocols in use") 226. For example, an average intelligent door lock may generate a volume of less than 1 KB per hour (i.e., average volume property 222 is equal to 1 KB/hour), is active mainly during morning and afternoon hours (i.e., the daily patterns property 224 identifies these hours), and operates only on UDP port 32323 (i.e., the protocols in use property 226 indicates UDP as in use).

When a new IoT device 104 is introduced in the home network 106, the home gateway 110 can fetch a basic IoT device profile 228 from a basic IoT device profile repository 230, which can be provided, for example, as part of an ISP's device repository. ISPs have visibility across homes using the same IoT devices, and thus have the capability to generate the basic IoT device profile 228. This helps in benchmarking newly-installed IoT devices 104 that might have been compromised prior to being introduced into the home network 106.

The IoT device profile 220 can contain sub-profiles (not shown), one for daily events and another for less frequent maintenance events ("IoT maintenance events") 232. In this manner, the IoT device profiler 218 can distinguish between maintenance events 232, such as software upgrades, that can trigger an anomaly alert due to a high download bytes rate and normal daily processes. Since IoT maintenance events 232 are common to many devices from a particular brand or model, if one home gateway 110 identifies an IoT maintenance event 232 (e.g., a software upgrade), that home gateway 110 can announce the IoT maintenance event 232 to a shared anomalies repository ("anomalies repository") 234. Other home gateways 110 can obtain the software upgrade from the anomalies repository 234. For example, if several smart thermostats downloaded a software update, homes that have these devices would get a notification to anticipate such a software update.

The IoT device profiler 218 can periodically generate an anomaly report 236 (e.g., every hour) for each tracked IoT device and can send the anomaly report 236 to the anomalies repository 234. If no anomaly is found during a given period, the IoT device profiler 218 can forgo sending the anomaly report 236. The anomaly report 236 can indicate a change in volume, the time the change took place, the duration, and the type of packets used. If such an event continues for more than the reporting period (e.g., one hour), the IoT device profiler 218 can generate additional anomaly reports 236. For example, if a smart light bulb anomaly is detected, an example anomaly report 236 may indicate that the volume has increased by 2540%, a start time of 10:42:04, an indication that the device is still active, and that the packet type is ICMP.

The home gateways 110 also can include a correlator 238. The correlator 238 can consume DDoS attack reports 240 from the DDoS attack profiler 202 and can correlate the DDoS attack reports 240 with the anomaly report(s) 236 in the anomalies repository 234. The correlator 238 matches properties of a known DDoS attack, based on the DDoS attack profile 204, from those in the anomalies repository 234, and identifies the IoT devices 104 that participated in the DDoS attack as a bot. For each match, the correlator 238 stores a bot match record 242 in a bot match repository 244. The bot match record 242 can include the following properties: record time, DDoS attack ID (uniquely identifies the DDoS attack), IoT device ID(s) (uniquely identifying the IoT devices involved), and a certainty score.

As explained in greater detail herein, the DDoS attack IDs are common to all DDoS reports to allow later report correlation with other home residential gateways. The IoT device ID is local to the home and is allocated and maintained by the home gateway 110. The certainty score indicates the likelihood of the correlation between the IoT device to the DDoS attack 112. For example, a device that usually uses UDP packets and has an average volume of 100B per hour, suddenly sending millions of TCP SYN packets, would have a high certainty score. As opposed to a moderate change of volume (for example, 35%) of the same packet type.

Figure 3:
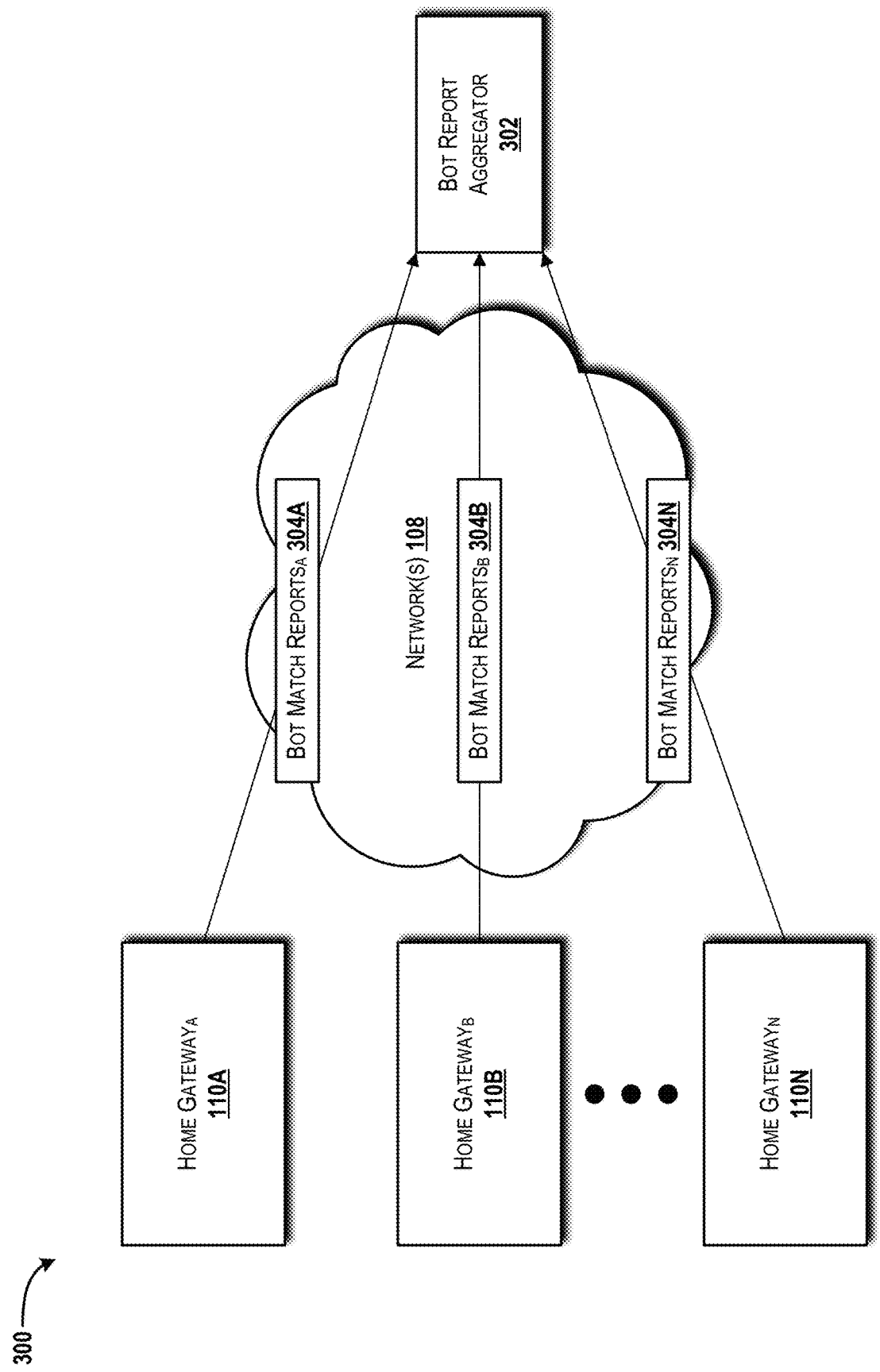
FIG. 3 is a block diagram illustrating another operating environment in which aspects of the concepts and technologies disclosed herein can be implemented.

Turning now to FIG. 3, a block diagram illustrating another operating environment 300 in which aspects of the concepts and technologies disclosed herein can be implemented will be described. The operating environment 300 includes the home gateways 110A-110N (best shown in FIG. 1) operating in communication with a bot report aggregator 302 via the network(s) 108. The bot report aggregator 302 can collect bot match reports 304A-304N from the home gateways 110. The bot report aggregator 302 should have records for all suspected bots for each DDoS attack 112. Moreover, the bot report aggregator 302 can track the bot match reports 304 from several DDoS attack campaigns and can identify shared sets of bots that participated in different campaigns. The motivation to compare participants from various botnet campaigns is derived from the economic model of the DDoS attacks 112. In practice, there are numerous botnet infrastructures operated by different criminal organizations. These organizations accept orders from third parties that want to lease the botnet infrastructure to harm a particular target. Therefore, while there are hundreds of DDoS attacks 112 each day, fewer botnet networks actually execute these attacks. This identification model allows the disclosed system to attribute each attack to a specific botnet by correlating the set of involved IoT devices 104 (bots).

Figure 4:
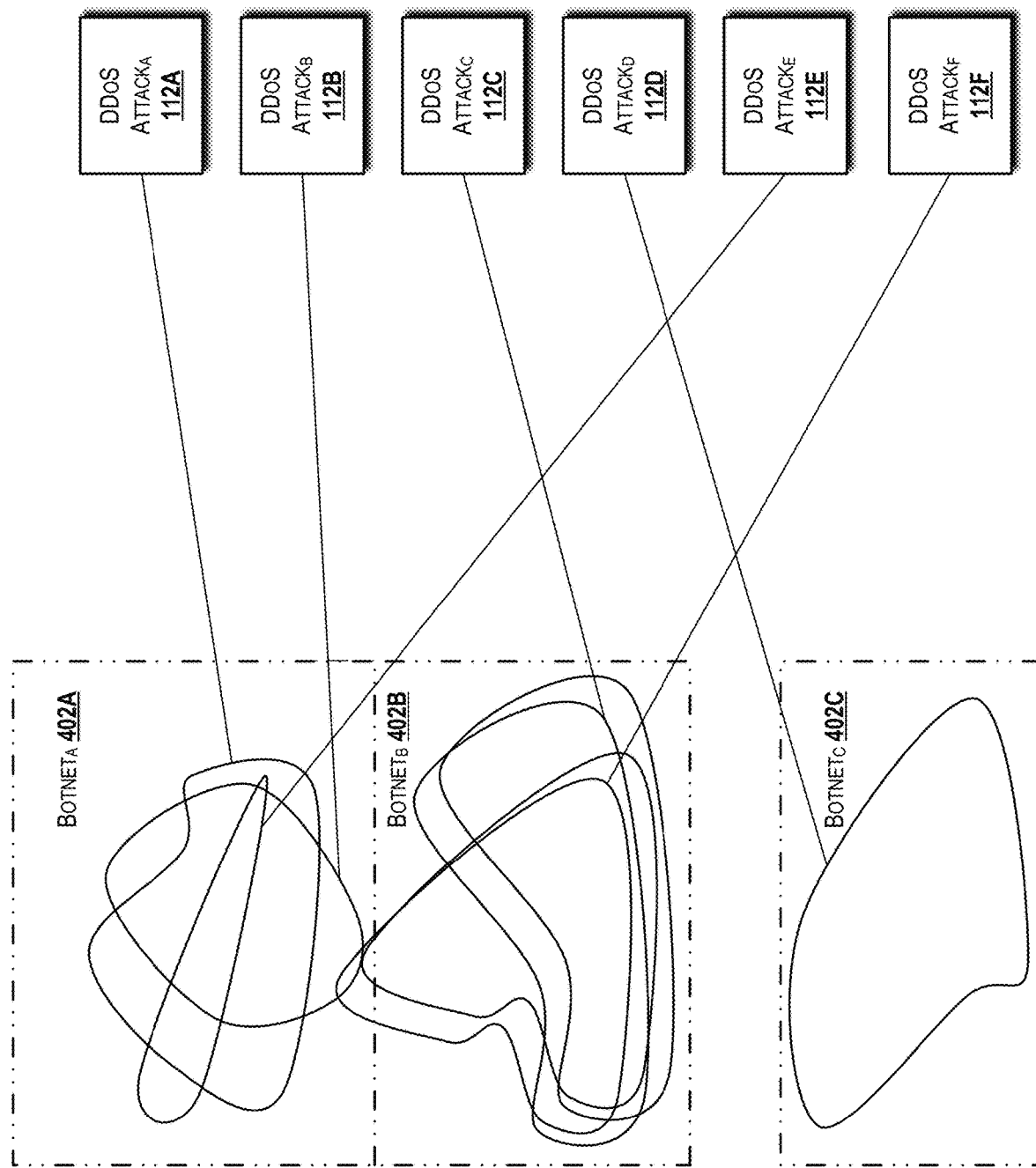
FIG. 4 is a block diagram illustrating an example scenario during which six DDoS attacks took place at different times, according to an exemplary embodiment of the concepts and technologies disclosed herein.

Turning now to FIG. 4, a block diagram illustrating an example scenario 400 during which six DDoS attacks 112A-112F took place at different times will be described, according to an exemplary embodiment of the concepts and technologies disclosed herein. When correlating the bot match reports 304, the bot report aggregator 302 (best shown in FIG. 3) can determine that similar bots were used for DDoS attack$_A$ 112A, DDoS attack$_B$ 112B, and DDoS attack$_E$ 112E, thus forming a first botnet ("botnet$_A$") 402A. Not all bots participated in all three of these DDoS attacks 112A, 112B, 112E, but the majority of the bots are common to the three DDoS attacks 112A, 112B, 112E. This can happen because some bot devices were unavailable, or the botnet operator decided to use only a subset of the botnet. It also appears that a second botnet ("botnet$_B$") 402B was involved in the DDoS attack$_C$ 112C and the DDoS attack$_F$ 112F, and a third botnet ("botnet$_C$") 402C was involved in the DDoS attack$_D$ 112D. The botnet$_A$ 402A and the botnet$_B$ 402B share a few bot devices. Since the connection is very weak between these clusters, it can be assumed that these are two separate botnets 402A, 402B. An explanation for such phenomena could be that the bot match report 304 was false. Another reason could be that a single IoT device 104 is infected with more than one malware serving multiple botnets 402. A botnet clustering algorithm can maintain, for each bot, a counter that indicates the number of DDoS attacks 112 with which it is associated. A higher count is representative of a higher certainty that an IoT device 104 is infected. Another aspect of the botnet clustering algorithm is to determine if two or more botnets 402 should be combined into one botnet 402 and if a single botnet 402 should be broken into several botnets. The above solution generates a mapping between a set of botnets 402 to IoT devices 104 the botnets 402 harvested in the home networks 106. Each botnet 402 may use different malware and communication technologies. Therefore, knowing the botnet 402 and its technology makes it easier to remediate the set of IoT devices 104 mapped to the botnet 402. For many of the cases, a simple change of password may suffice while for other cases there may be a need to install a software patch that fixes the vulnerability.

Figure 5:
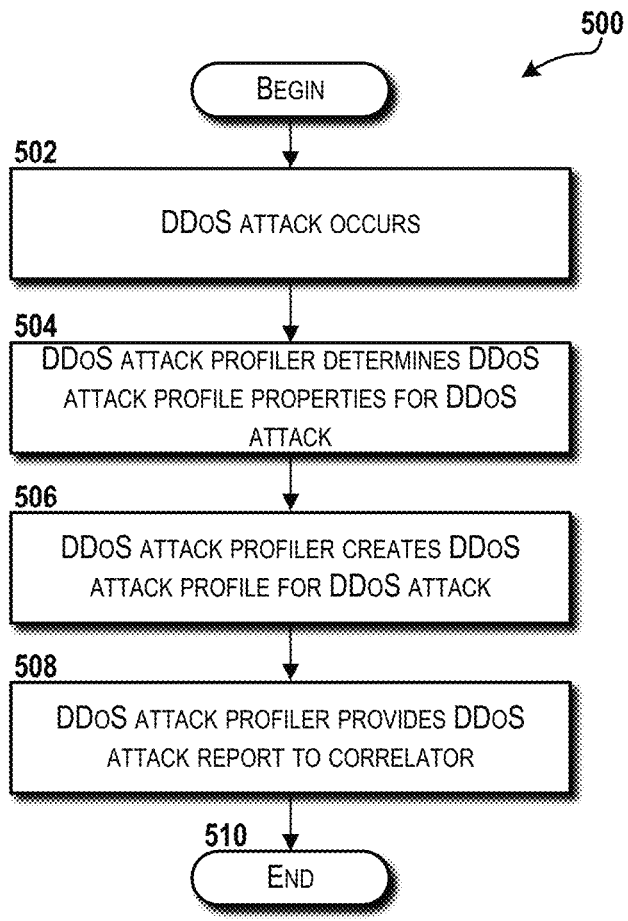
FIG. 5 is a flow diagram illustrating aspects of a method for determining a DDoS attack profile, according to an illustrative embodiment of the concepts and technologies disclosed herein.

Turning now to FIG. 5, a flow diagram illustrating aspects of a method 500 for determining a DDoS attack profile 204 will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 begins and proceeds to operation 502. At operation 502, a DDoS attack 112 occurs. From operation 502, the method 500 proceeds to operation 504. At operation 504, the DDoS attack profiler 202 determines the DDoS attack profile 204 properties for the DDoS attack 112. For example, the DDoS attack profiler 202 can determine the volume property 206, the time/duration property 208, the packet type property 210, the source rotation property 212, the profiling method property 214, and the device(s) in use property 216. From operation 504, the method 500 proceeds to operation 506. At operation 506, the DDoS attack profiler 202 creates the DDoS attack profile 204 for the DDoS attack 112 with the properties determined at operation 504. From operation 506, the method 500 proceeds to operation 508. At operation 508, the DDoS attack profiler 202 provides the DDoS attack report 240 to the correlator 238. From operation 508, the method 500 proceeds to operation 510. The method 500 can end at operation 510.

Figure 6:
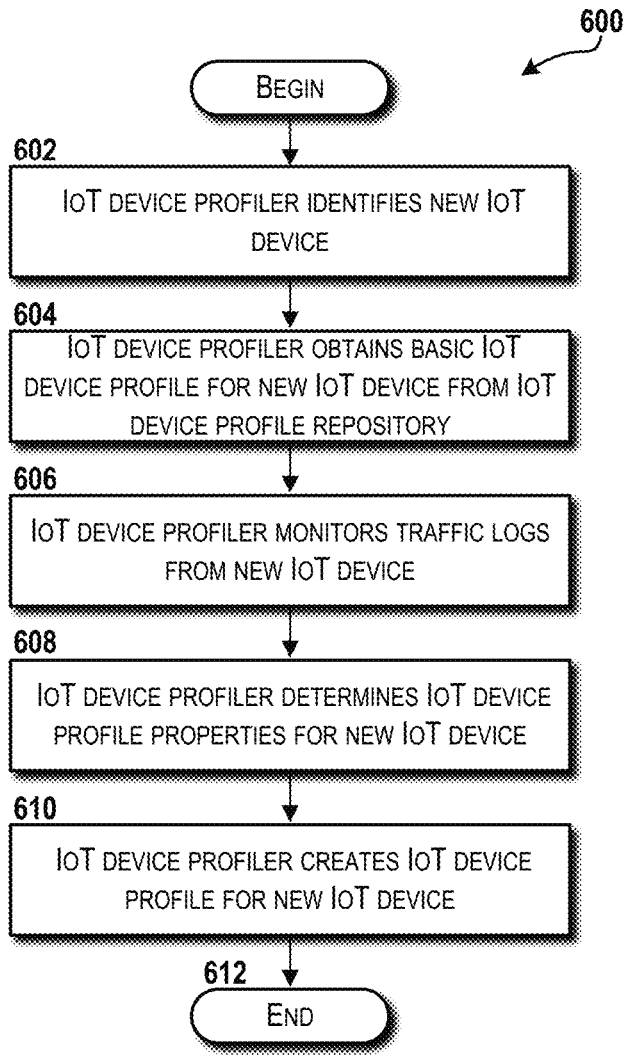
FIG. 6 is a flow diagram illustrating aspects of a method for determining an IoT device profile, according to an illustrative embodiment of the concepts and technologies disclosed herein.

Turning now to FIG. 6, a flow diagram illustrating aspects of a method 600 for determining an IoT device profile 220 will be described, according to an illustrative embodiment of the concepts and technologies disclosed herein. The method 600 begins and proceeds to operation 602. At operation 602, the IoT device profiler 218 identifies a new IoT device 104 added to the home network 106. From operation 602, the method 600 proceeds to operation 604. At operation 604, the IoT device profiler 218 obtains the basic IoT device profile 228 for the new IoT device 104 from the basic IoT device profile repository 230. From operation 604, the method 600 proceeds to operation 606. At operation 606, the IoT device profiler 218 monitors traffic logs from the new IoT device 104. From operation 606, the method 600 proceeds to operation 608. At operation 608, the IoT device profiler 218 determines, based upon the traffic logs and the basic IoT device profile 228, the IoT device profile 220 properties for the new IoT device 104. For example, the IoT device profiler 218 can determine the average volume property 222, the daily patterns property 224, the packet type property 210, the source rotation property 212, the profiling method property 214, and the device(s) in use property 216. From operation 608, the method 600 proceeds to operation 610. At operation 610, the IoT device profiler 218 creates the IoT device profile 220 for the new IoT device 104. From operation 610, the method 600 proceeds to operation 612. The method 600 can end at operation 612.

Figure 7:
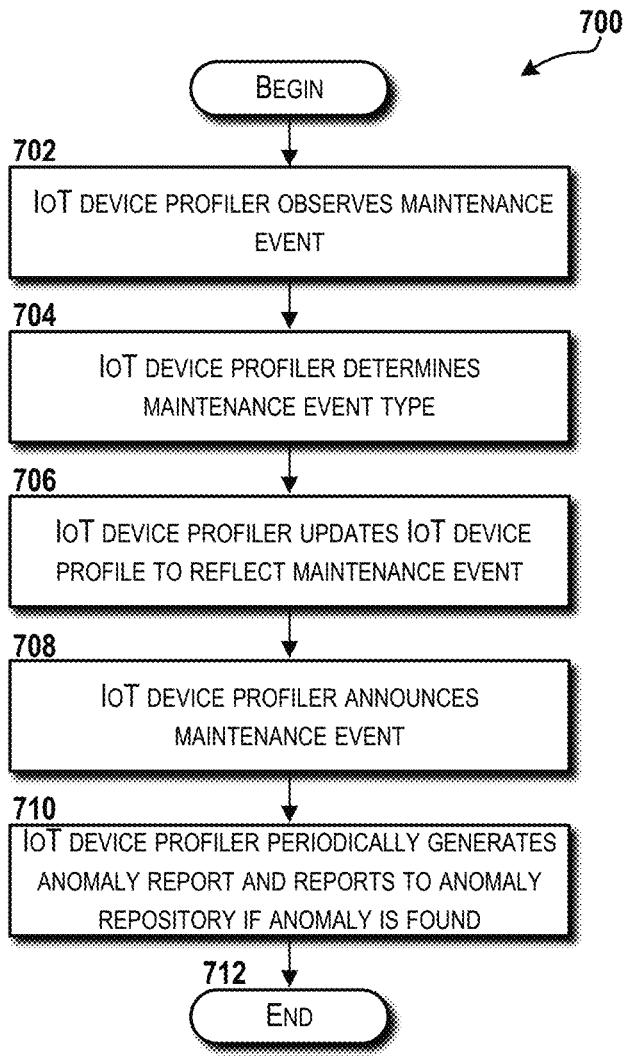
FIG. 7 is a flow diagram illustrating aspects of a method for handling IoT maintenance events, according to an illustrative embodiment of the concepts and technologies disclosed herein.

Turning now to FIG. 7, a flow diagram illustrating aspects of a method 700 for handling IoT maintenance events 232 will be described, according to an illustrative embodiment of the concepts and technologies disclosed herein. The method 700 begins and proceeds to operation 702. At operation 702, the IoT device profiler 218 observes an IoT maintenance event 232. From operation 702, the method 700 proceeds to operation 704. At operation 704, the IoT device profiler 218 determines a maintenance event type of the IoT maintenance event 232. For example, the maintenance event type may be a software update, a firmware update, a security patch, a test, a combination thereof, and/or the like. From operation 704, the method 700 proceeds to operation 706. At operation 706, the IoT device profiler 218 updates the IoT device profile 220 to reflect the IoT maintenance event 232. From operation 706, the method 700 proceeds to operation 708. At operation 708, the IoT device profiler 218 announces the IoT maintenance event 232. For example, the IoT device profiler 218 can announce the IoT maintenance event 232 to other IoT devices 104 connected to the home gateway 110 that share the same basic IoT device profile 228. In some embodiments, the IoT device profiler 218 can announce the IoT maintenance event 232 to other home gateway 110 via the network(s) 108. From operation 708, the method 700 proceeds to operation 710. At operation 710, the IoT device profiler 218 periodically (e.g., every hour) generates an anomaly report 236 and sends the anomaly report 236 to the anomaly repository 234 if an anomaly is found. From operation 710, the method 700 proceeds to operation 712. The method 700 can end at operation 712.

Figure 8:
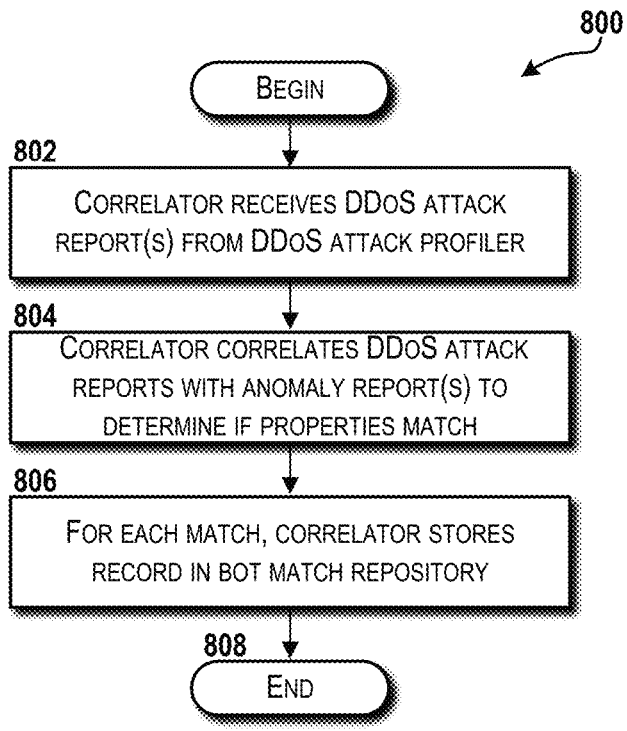
FIG. 8 is a flow diagram illustrating aspects of a method for determining bot match records, according to an illustrative embodiment of the concepts and technologies disclosed herein.

Turning now to FIG. 8, a flow diagram illustrating aspects of a method 800 for determining bot match records 242 will be described, according to an illustrative embodiment of the concepts and technologies disclosed herein. The method 800 begins and proceeds to operation 802. At operation 802, the correlator 238 receives the DDoS attack report(s) 240 from the DDoS attack profiler 202. From operation 802, the method 800 proceeds to operation 804. At operation 804, the correlator 238 correlates the DDoS attack reports 240 with the anomaly report(s) 236 from the anomalies repository 234 to determine if the properties match. From operation 804, the method 800 proceeds to operation 806. At operation 806, for each match, the correlator 238 stores a bot match record 242 in the bot match repository 244. From operation 806, the method 800 proceeds to operation 808. The method 800 can end at operation 808.

Figure 9:
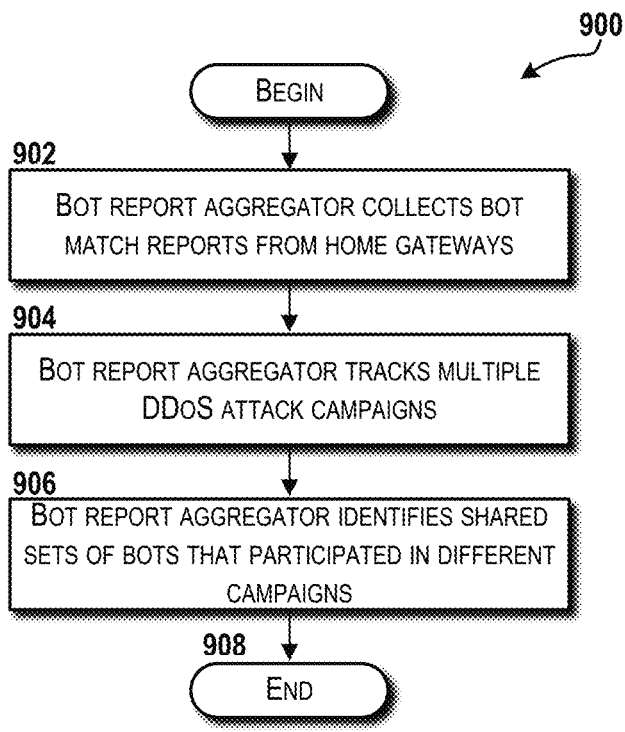
FIG. 9 is a flow diagram illustrating aspects of a method for determining botnets used in one or more DDoS attacks, according to an illustrative embodiment of the concepts and technologies disclosed herein.

Turning now to FIG. 9, a flow diagram illustrating aspects of a method 900 for determining botnets 402 used in one or more DDoS attacks 112 will be described, according to an illustrative embodiment of the concepts and technologies disclosed herein. The method 900 begins and proceeds to operation 902. At operation 902, the bot report aggregator 302 collects bot match results from the home gateways 110. From operation 902, the method 900 proceeds to operation 904. At operation 904, the bot report aggregator 302 tracks multiple DDoS attack 112 campaigns. From operation 904, the method 900 proceeds to operation 906. At operation 906, the bot report aggregator 302 identifies shared sets of bots that participated in different DDoS attack 112 campaigns. From operation 906, the method 900 proceeds to operation 908. The method 900 can end at operation 908.

Figure 10:
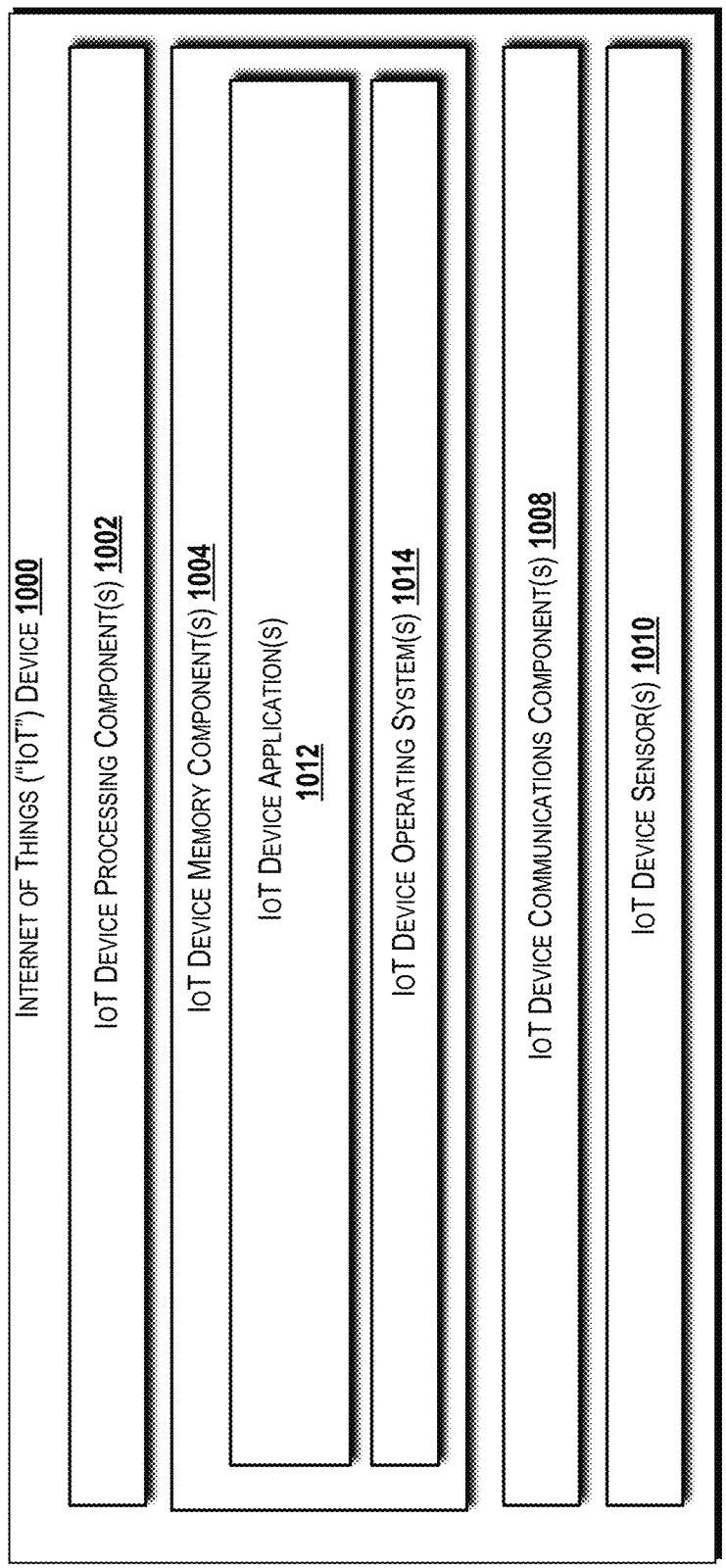
FIG. 10 is a block diagram illustrating an example IoT device capable of implementing aspects of the concepts and technologies disclosed herein.

Turning now to FIG. 10, a block diagram illustrating aspects of an example IoT device 1000 and components thereof capable of implementing aspects of the embodiments presented herein will be described. In some embodiments, one or more of the IoT devices 104 is/are configured similar to or the same as the IoT device 1000. While connections are not shown between the various components illustrated in FIG. 10, it should be understood that some, none, or all of the components illustrated in FIG. 10 can be configured to interact with one another to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

The illustrated IoT device 1000 includes one or more IoT device processing components 1002, one or more IoT device memory components 1004, one or more IoT device communications components 1008, and one or more IoT device sensors 1010. The IoT device processing components 1002 can include one or more hardware components that perform computations to process data, and/or to execute computer-executable instructions of one or more application programs such as one or more IoT device application(s) 1012, one or more IoT device operating system(s) 1014, and/or other software. The IoT device processing component(s) 1002 can include one or more CPUs configured with one or more processing cores. The IoT device processing component(s) 1002 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT device processing component(s) 1002 can include one or more discrete GPUs. In some other embodiments, the IoT device processing component(s) 1002 can include CPU and GPU components that are configured in accordance with a co-processing CPU/GPU computing model, wherein the sequential part of an application executes on the CPU and the computationally-intensive part is accelerated by the GPU. The IoT device processing component(s) 1002 can include one or more system on a chip ("SoC") components along with one or more other components illustrated as being part of the IoT device 1000, including, for example, the IoT device memory component 1004, the IoT device communications component(s) 1008, the IoT device sensor(s) 1010, or some combination thereof. In some embodiments, the IoT device processing component(s) 1002 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more OMAP SoCs, available from TEXAS INSTRUMENTS of Dallas, Texas; one or more customized versions of any of the above SoCs; and/or one or more proprietary SoCs. The IoT device processing component(s) 1002 can be or can include one or more hardware components architected in accordance with an ARM architecture, available for license from ARM HOLDINGS of Cambridge, United Kingdom. Alternatively, the IoT device processing component(s) 1002 can be or can include one or more hardware components architected in accordance with an x86 architecture, such an architecture available from INTEL CORPORATION of Mountain View, California, and others. Those skilled in the art will appreciate the implementation of the IoT device processing component(s) 1002 can utilize various computation architectures, and as such, the IoT device processing component(s) 1002 should not be construed as being limited to any particular computation architecture or combination of computation architectures, including those explicitly disclosed herein.

The IoT device memory component(s) 1004 can include one or more hardware components that perform storage operations, including temporary or permanent storage operations. In some embodiments, the IoT device memory component(s) 1004 can include volatile and/or non-volatile memory implemented in any method or technology for storage of information such as computer-readable instructions, data structures, program modules, the IoT device operating system(s) 1014, the IoT device application(s) 1012, combinations thereof, and/or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT device processing component(s) 1002.

The IoT device application(s) 1012 can be executed by the IoT device processing component(s) 1002 to perform various IoT operations. For example, the IoT device application(s) 1012 can instruct the IoT device sensor(s) 1010 to collect data and share the data with the home gateway 110. The IoT device application(s) 1012 can execute on top of the IoT device operating system(s) 1014. In some embodiments, the IoT device application(s) 1012 can be provided as firmware.

The IoT device operating system(s) 1014 can control the operation of the IoT device 1000. In some embodiments, the IoT device operating system(s) 1014 includes the functionality of the IoT device application(s) 1012. The IoT device operating system(s) 1014 can be executed by the IoT device processing component(s) 1002 to cause the IoT device 1000 to perform various operations. The IoT device operating system(s) 1014 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IoT device sensor(s) 1010 can include any sensor type or combination of sensor types utilizing any known sensor technology that is capable of detecting one or more characteristics of an environment in which the IoT device 1000 is deployed. More particularly, the IoT device sensor(s) 1010 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. Those skilled in the art will appreciate the applicability of the IoT device sensors 1010 to various aspects of IoT services, and for this reason, additional details in this regard are not provided.

The IoT device communications component(s) 1008 can include an RF transceiver or separate receiver and transmitter components. The IoT device communications component 1008 can include one or more antennas and one or more RF receivers for receiving RF signals from and one or more RF transmitters for sending RF signals to other IoT devices 1000, the home network 106, and/or the home gateway 110. It is contemplated that the IoT device communications component(s) 1008 also may include a wired connection to the home network 106.

Figure 11:
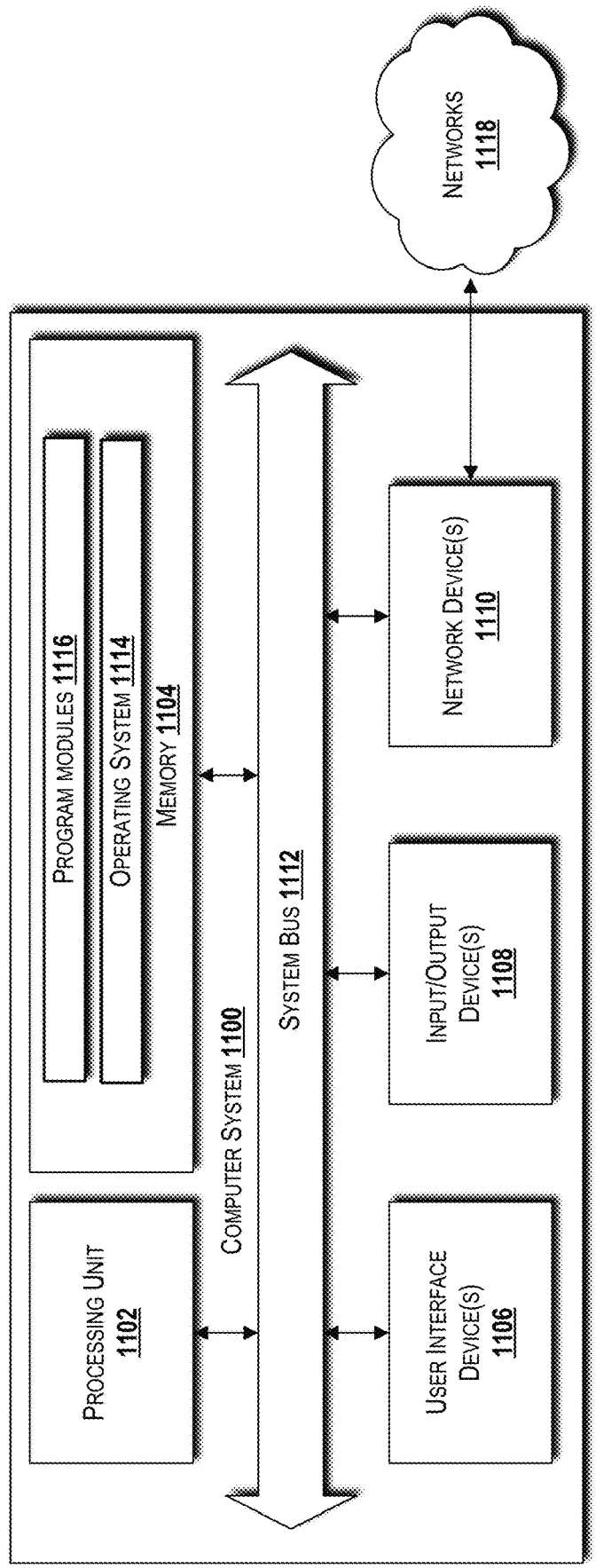
FIG. 11 is a block diagram illustrating an example computer system capable of implementing aspects of the concepts and technologies disclosed herein.

Turning now to FIG. 11, a block diagram illustrating a computer system 1100 configured to provide the functionality described herein in accordance with various embodiments. In some embodiments, aspects of the home gateways 110, one or more systems/devices operating on or in communication with the home networks 106, one or more systems operating on or in communication with the network(s) 108, or other systems disclosed herein can be configured the same as or similar to the computer system 1100.

The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 1102 can be a single processing unit or a multiple processing unit that includes more than one processing component. Processing units are generally known, and therefore are not described in further detail herein.

The memory 1104 communicates with the processing unit 1102 via the system bus 1112. The memory 1104 can include a single memory component or multiple memory components. In some embodiments, the memory 1104 is operatively connected to a memory controller (not shown) that enables communication with the processing unit 1102 via the system bus 1112. The memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 1116 may include various software and/or program modules described herein. The program modules 1116 can include, for example, the DDoS attack profiler 202, the IoT device profiler 218, and the correlator 238. In some embodiments, multiple implementations of the computer system 1100 can be used, wherein each implementation is configured to execute one or more of the program modules 1116. The program modules 1116 and/or other programs can be embodied in computer-readable media containing instructions that, when executed by the processing unit 1102, perform the methods 500, 600, 700, 800, 900 described herein. According to embodiments, the program modules 1116 may be embodied in hardware, software, firmware, or any combination thereof. The memory 1104 also can be configured to store data described herein.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium," "computer-readable storage medium," and variations thereof does not include waves or signals per se and/or communication media, and therefore should be construed as being directed to "non-transitory" media only.

The user interface devices 1106 may include one or more devices with which a user accesses the computer system 1100. The user interface devices 1106 may include, but are not limited to, computers, servers, personal digital assistants, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, a touch-sensitive surface, or an electronic stylus. Further, the I/O devices 1108 may include one or more output devices.

The network devices 1110 enable the computer system 1100 to communicate with one or more networks 1118, such as the home networks 106 and/or the network(s) 108 described herein. Examples of the network devices 1110 include, but are not limited to, a modem, a radio frequency ("RF") or infrared ("IR") or ultraviolet ("UV") transceiver, a telephonic interface, a bridge, a router, or a network card. The network 1118 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 1118 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 12:
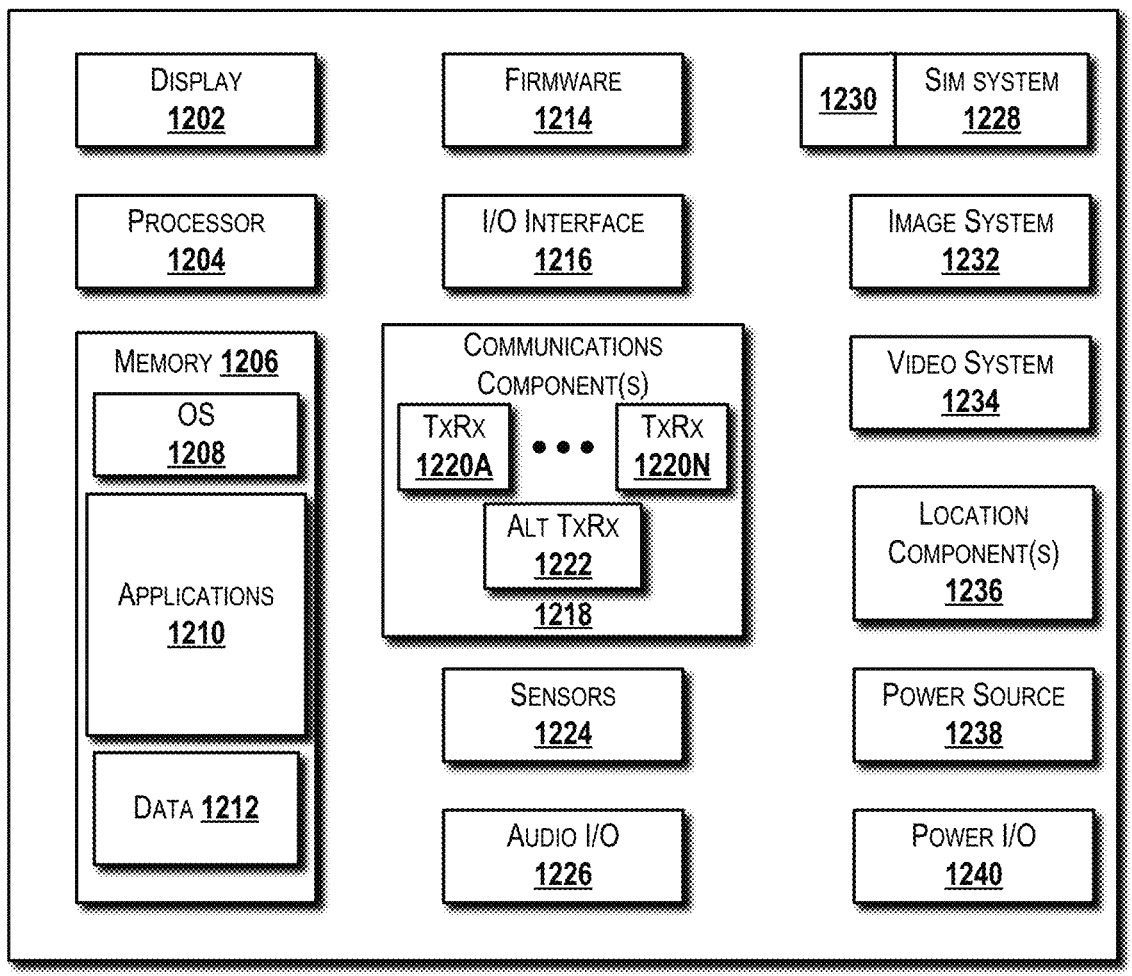
FIG. 12 is a block diagram illustrating an example mobile device capable of implementing aspects of the concepts and technologies disclosed herein.

Turning now to FIG. 12, an illustrative mobile device 1200 and components thereof will be described. While connections are not shown between the various components illustrated in FIG. 12, it should be understood that some, none, or all of the components illustrated in FIG. 12 can be configured to interact with one another to carry out various device functions. In some embodiments, the components are arranged so as to communicate via one or more busses (not shown). Thus, it should be understood that FIG. 12 and the following description are intended to provide a general understanding of a suitable environment in which various aspects of embodiments can be implemented, and should not be construed as being limiting in any way.

As illustrated in FIG. 12, the mobile device 1200 can include a display 1202 for displaying data. According to various embodiments, the display 1202 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 1200 can also include a processor 1204 and a memory or other data storage device ("memory") 1206. The processor 1204 can be configured to process data and/or can execute computer-executable instructions stored in the memory 1206. The computer-executable instructions executed by the processor 1204 can include, for example, an operating system 1208, one or more applications 1210, other computer-executable instructions stored in the memory 1206, or the like. The applications 1210 can include, for example, a client application or companion application associated with the home gateway 110. In some embodiments, the applications 1210 can also include a UI application (not illustrated in FIG. 12).

The UI application can interface with the operating system 1208 to facilitate user interaction with functionality and/or data stored at the mobile device 1200 and/or stored elsewhere. In some embodiments, the operating system 1208 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1204 to aid a user in entering/deleting data, entering and setting user IDs and passwords for device access, configuring settings, manipulating content and/or settings, multimode interaction, interacting with other applications 1210, and otherwise facilitating user interaction with the operating system 1208, the applications 1210, and/or other types or instances of data 1212 that can be stored at the mobile device 1200.

The applications 1210, the data 1212, and/or portions thereof can be stored in the memory 1206 and/or in a firmware 1214, and can be executed by the processor 1204. The firmware 1214 can also store code for execution during device power up and power down operations. It can be appreciated that the firmware 1214 can be stored in a volatile or non-volatile data storage device including, but not limited to, the memory 1206 and/or a portion thereof.

The mobile device 1200 can also include an input/output ("I/O") interface 1216. The I/O interface 1216 can be configured to support the input/output of data such as location information, presence status information, user IDs, passwords, and application initiation (start-up) requests. In some embodiments, the I/O interface 1216 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 1200 can be configured to synchronize with another device to transfer content to and/or from the mobile device 1200. In some embodiments, the mobile device 1200 can be configured to receive updates to one or more of the applications 1210 via the I/O interface 1216, though this is not necessarily the case. In some embodiments, the I/O interface 1216 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 1216 may be used for communications between the mobile device 1200 and a network device or local device.

The mobile device 1200 can also include a communications component 1218. The communications component 1218 can be configured to interface with the processor 1204 to facilitate wired and/or wireless communications with one or more networks, such as the home networks 106, the network(s) 108, or some combination thereof. In some embodiments, the communications component 1218 includes a multimode communications subsystem for facilitating communications via the cellular network and one or more other networks.

The communications component 1218, in some embodiments, includes one or more transceivers. The one or more transceivers, if included, can be configured to communicate over the same and/or different wireless technology standards with respect to one another. For example, in some embodiments, one or more of the transceivers of the communications component 1218 may be configured to communicate using GSM, CDMA CDMAONE, CDMA2000, LTE, and various other 2G, 2.5G, 3G, 4G, 4.5G, 5G, 6G, 7G, and greater generation technology standards. Moreover, the communications component 1218 may facilitate communications over various channel access methods (which may or may not be used by the aforementioned standards) including, but not limited to, TDMA, FDMA, CDMA, W-CDMA, OFDMA, SDMA, and the like.

In addition, the communications component 1218 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 11G technologies and standards, and various other current and future wireless data access technologies and standards. In the illustrated embodiment, the communications component 1218 can include a first transceiver ("TxRx") 1220A that can operate in a first communications mode (e.g., GSM). The communications component 1218 can also include an $N^{th}$ transceiver ("TxRx") 1220N that can operate in a second communications mode relative to the first transceiver 1220A (e.g., UMTS). While two transceivers 1220A-1220N (hereinafter collectively and/or generically referred to as "transceivers 1220") are shown in FIG. 12, it should be appreciated that less than two, two, and/or more than two transceivers 1220 can be included in the communications component 1218.

The communications component 1218 can also include an alternative transceiver ("Alt TxRx") 1222 for supporting other types and/or standards of communications. According to various contemplated embodiments, the alternative transceiver 1222 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1218 can also facilitate reception from terrestrial radio networks, digital satellite radio networks, internet-based radio service networks, combinations thereof, and the like. The communications component 1218 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1200 can also include one or more sensors 1224. The sensors 1224 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1200 may be provided by an audio I/O component 1226. The audio I/O component 1226 of the mobile device 1200 can include one or more speakers for the output of audio signals, one or more microphones for the collection and/or input of audio signals, and/or other audio input and/or output devices.

The illustrated mobile device 1200 can also include a subscriber identity module ("SIM") system 1228. The SIM system 1228 can include a universal SIM ("USIM"), a universal integrated circuit card ("UICC"), embedded SIM ("eSIM"), and/or other identity devices. The SIM system 1228 can include and/or can be connected to or inserted into an interface such as a slot interface 1230. In some embodiments, the slot interface 1230 can be configured to accept insertion of other identity cards or modules for accessing various types of networks. Additionally, or alternatively, the slot interface 1230 can be configured to accept multiple subscriber identity cards. Additionally, or alternatively, an embedded SIM may be used. Because other devices and/or modules for identifying users and/or the mobile device 1200 are contemplated, it should be understood that these embodiments are illustrative, and should not be construed as being limiting in any way.

The mobile device 1200 can also include an image capture and processing system 1232 ("image system"). The image system 1232 can be configured to capture or otherwise obtain photos, videos, and/or other visual information. As such, the image system 1232 can include cameras, lenses, charge-coupled devices ("CCDs"), combinations thereof, or the like. The mobile device 1200 may also include a video system 1234. The video system 1234 can be configured to capture, process, record, modify, and/or store video content. Photos and videos obtained using the image system 1232 and the video system 1234, respectively, may be added as message content to an MMS message, email message, and sent to another device. The video and/or photo content can also be shared with other devices via various types of data transfers via wired and/or wireless communication devices as described herein.

The mobile device 1200 can also include one or more location components 1236. The location components 1236 can be configured to send and/or receive signals to determine a geographic location of the mobile device 1200. According to various embodiments, the location components 1236 can send and/or receive signals from global positioning system ("GPS") devices, assisted-GPS ("A-GPS") devices, WI-FI/WIMAX and/or cellular network triangulation data, combinations thereof, and the like. The location component 1236 can also be configured to communicate with the communications component 1218 to retrieve triangulation data for determining a location of the mobile device 1200. In some embodiments, the location component 1236 can interface with cellular network nodes, telephone lines, satellites, location transmitters and/or beacons, wireless network transmitters and receivers, combinations thereof, and the like. In some embodiments, the location component 1236 can include and/or can communicate with one or more of the sensors 1224 such as a compass, an accelerometer, and/or a gyroscope to determine the orientation of the mobile device 1200. Using the location component 1236, the mobile device 1200 can generate and/or receive data to identify its geographic location, or to transmit data used by other devices to determine the location of the mobile device 1200. The location component 1236 may include multiple components for determining the location and/or orientation of the mobile device 1200.

The illustrated mobile device 1200 can also include a power source 1238. The power source 1238 can include one or more batteries, power supplies, power cells, and/or other power subsystems including alternating current ("AC") and/or direct current ("DC") power devices. The power source 1238 can also interface with an external power system or charging equipment via a power I/O component 1240. Because the mobile device 1200 can include additional and/or alternative components, the above embodiment should be understood as being illustrative of one possible operating environment for various embodiments of the concepts and technologies described herein. The described embodiment of the mobile device 1200 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1200 or other devices or computers described herein, such as the computer system 1100 described above with reference to FIG. 11. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1200 in order to store and execute the software also components presented herein. It is contemplated that the mobile device 1200 may not include all of the components shown in FIG. 12, may include other components that are not explicitly shown in FIG. 12, or may utilize an architecture completely different than that shown in FIG. 12.

Figure 13:
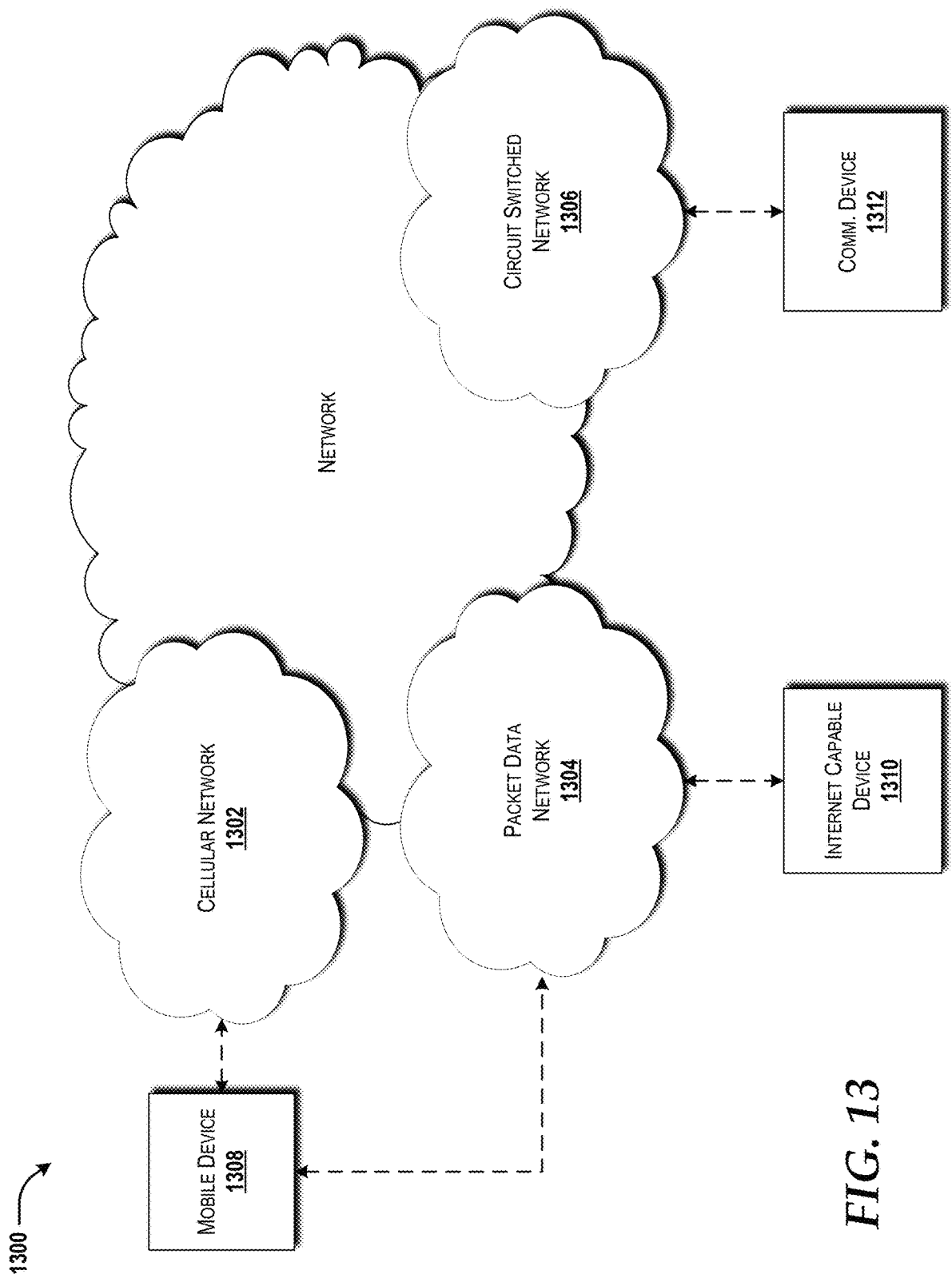
FIG. 13 is a block diagram illustrating an example network capable of implementing aspects of the concepts and technologies disclosed herein.

Turning now to FIG. 13, details of a network 1300 are illustrated, according to an illustrative embodiment. The network 1300 includes a cellular network 1302, a packet data network 1304, and a circuit switched network 1306. The cellular network 1302 includes various components such as, but not limited to, base stations, base transceiver stations ("BTSs"), node Bs ("NBs"), eNBs, gNBs, base station controllers ("BSCs"), radio network controllers ("RNCs"), mobile switching centers ("MSCs"), mobility management entities ("MMEs"), serving gateways ("SGWs"), packet data gateways ("PDGs"), evolved PDGs ("ePDGs"), AAA servers, home subscriber servers, short message service centers ("SMSCs"), multimedia messaging service centers ("MMSCs"), home location registers ("HLRs"), visitor location registers ("VLRs"), charging platforms, billing platforms, voicemail platforms, GPRS core network components, EPC core network components, future generation core network components, location service nodes, virtualizations thereof, combinations thereof, and/or the like. The cellular network 1302 also includes radios and nodes for receiving and transmitting voice, data, and combinations thereof to and from radio transceivers, networks, the packet data network 1304, and the circuit switched network 1306.

A mobile communications device 1308, such as, for example, the mobile device 1200, a cellular telephone, a user equipment, a mobile terminal, a PDA, a laptop computer, a handheld computer, and combinations thereof, can be operatively connected to the cellular network 1302 and/or the packet data network 1304. The mobile communications device 1308 can be configured similar to or the same as the mobile device 1200 described above with reference to FIG. 12.

The cellular network 1302 can be configured as a GSM network and can provide data communications via GPRS and/or EDGE. Additionally, or alternatively, the cellular network 1302 can be configured as a 3G UMTS network and can provide data communications via the HSPA protocol family, for example, HSDPA, EUL, and HSPA+. The cellular network 1302 also is compatible with mobile communications standards such as LTE, 5G-NR, or the like, as well as evolved and future mobile standards.

The packet data network 1304 includes various systems, devices, servers, computers, databases, and other devices in communication with one another, as is generally known. In some embodiments, the packet data network 1304 is or includes one or more WI-FI networks, such as the home networks 106, each of which can include one or more WI-FI access points. The packet data network 1304 also can include the network(s) 108. The packet data network 1304 also can include routers, switches, and other WI-FI network components. The packet data network 1304 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1304 includes or is in communication with the Internet. The circuit switched network 1306 includes various hardware and software for providing circuit switched communications. The circuit switched network 1306 may include, or may be, what is often referred to as a plain old telephone system ("POTS"). The functionality of a circuit switched network 1306 or other circuit-switched network are generally known and will not be described herein in detail.

The illustrated cellular network 1302 is shown in communication with the packet data network 1304 and a circuit switched network 1306, though it should be appreciated that this is not necessarily the case. One or more Internet-capable systems/devices 1310 such as a laptop, a portable device, or another suitable device, can communicate with one or more cellular networks 1302, and devices connected thereto, through the packet data network 1304. It also should be appreciated that the mobile device 1308 can communicate directly with the packet data network 1304. It also should be appreciated that the Internet-capable device 1310 can communicate with the packet data network 1304 through the circuit switched network 1306, the cellular network 1302, and/or via other networks (not illustrated).

As illustrated, a communications device 1312, for example, a telephone, facsimile machine, modem, computer, or the like, can be in communication with the circuit switched network 1306, and therethrough to the packet data network 1304 and/or the cellular network 1302. It should be appreciated that the communications device 1312 can be an Internet-capable device, and can be substantially similar to the Internet-capable device 1310.

Figure 14:
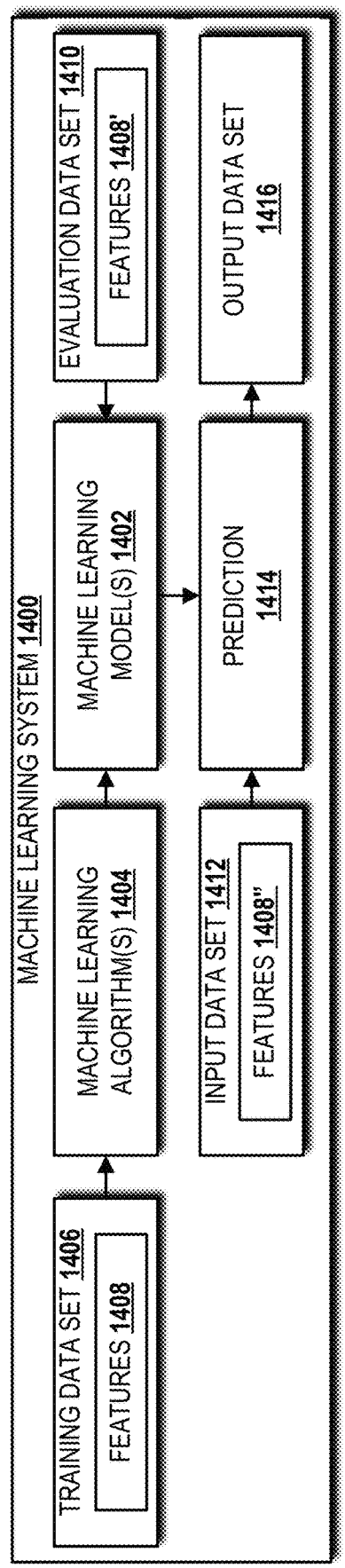
FIG. 14 is a block diagram illustrating an example machine learning system capable of implementing aspects of the concepts and technologies disclosed herein.

Turning now to FIG. 14, a machine learning system 1400 capable of implementing aspects of the embodiments disclosed herein will be described. In some embodiments, the home gateways 110 can include the machine learning system 1400. In other embodiments, the home gateways 110 can operate in communication with the machine learning system 1400. In any case, the machine learning system 1400 can be used to perform or assist various operations described herein such as, for example, determining the DDoS attack profiles 204, determining the IoT device profiles 220, and generating the anomaly reports 236. The machine learning system 1400 can be used to perform or assist other operations described herein.

The illustrated machine learning system 1400 includes one or more machine learning models 1402. The machine learning models 1402 can include, unsupervised, supervised, and/or semi-supervised learning models. The machine learning model(s) 1402 can be created by the machine learning system 1400 based upon one or more machine learning algorithms 1404. The machine learning algorithm(s) 1404 can be any existing, well-known algorithm, any proprietary algorithms, or any future machine learning algorithm. Some example machine learning algorithms 1404 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 1404 based upon the problem(s) to be solved by machine learning via the machine learning system 1400.

The machine learning system 1400 can control the creation of the machine learning models 1402 via one or more training properties. In some embodiments, the training properties are selected by machine learning modelers at the direction of an entity (e.g., a device manufacturer, ISP, other service provider, and/or a user). Alternatively, in some embodiments, the training properties are automatically selected based upon data provided in one or more training data sets 1406. The training properties can include, for example, a learning rate, a model size, a number of training passes, data shuffling, regularization, and/or other training properties known to those skilled in the art.

The learning rate is a training parameter defined by a constant value. The learning rate affects the speed at which the machine learning algorithm 1404 converges to the optimal weights. The machine learning algorithm 1404 can update the weights for every data example included in the training data set 1406. The size of an update is controlled by the learning rate. A learning rate that is too high might prevent the machine learning algorithm 1404 from converging to the optimal weights. A learning rate that is too low might result in the machine learning algorithm 1404 requiring multiple training passes to converge to the optimal weights.

The model size is regulated by the number of input features ("features") 1408 in the training data set 1406. A greater the number of features 1408 yields a greater number of possible patterns that can be determined from the training data set 1406. The model size should be selected to balance the resources (e.g., compute, memory, storage, etc.) needed for training and the predictive power of the resultant machine learning model 1402.

The number of training passes indicates the number of training passes that the machine learning algorithm 1404 makes over the training data set 1406 during the training process. The number of training passes can be adjusted based, for example, on the size of the training data set 1406, with larger training data sets being exposed to fewer training passes in consideration of time and/or resource utilization.

The effectiveness of the resultant machine learning model 1402 can be increased by multiple training passes.

Data shuffling is a training parameter designed to prevent the machine learning algorithm 1404 from reaching false optimal weights due to the order in which data contained in the training data set 1406 is processed. For example, data provided in rows and columns might be analyzed first row, second row, third row, etc., and thus an optimal weight might be obtained well before a full range of data has been considered. By data shuffling, the data contained in the training data set 1406 can be analyzed more thoroughly and mitigate bias in the resultant machine learning model 1402.

Regularization is a training parameter that helps to prevent the machine learning model 1402 from memorizing training data from the training data set 1406. In other words, the machine learning model 1402 fits the training data set 1406, but the predictive performance of the machine learning model 1402 is not acceptable. Regularization helps the machine learning system 1400 avoid this overfitting/memorization problem by adjusting extreme weight values of the features 1408. For example, a feature that has a small weight value relative to the weight values of the other features in the training data set 1406 can be adjusted to zero.

The machine learning system 1400 can determine model accuracy after training by using one or more evaluation data sets 1410 containing the same features 1408' as the features 1408 in the training data set 1406. This also prevents the machine learning model 1402 from simply memorizing the data contained in the training data set 1406. The number of evaluation passes made by the machine learning system 1400 can be regulated by a target model accuracy that, when reached, ends the evaluation process and the machine learning model 1402 is considered ready for deployment.

After deployment, the machine learning model 1402 can perform a prediction operation ("prediction") 1414 with an input data set 1412 having the same features 1408" as the features 1408 in the training data set 1406 and the features 1408' of the evaluation data set 1410. The results of the prediction 1414 are included in an output data set 1416 consisting of predicted data. The machine learning model 1402 can perform other operations, such as regression, classification, and others. As such, the example illustrated in FIG. 14 should not be construed as being limiting in any way.

Based on the foregoing, it should be appreciated that aspects of correlating compromised home IoT devices with DDoS attacks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A home gateway system comprising:
a processor; and
a memory comprising instructions that, when executed by the processor, cause the processor to perform operations comprising
in response to a distributed denial of service ("DDoS") attack, determining, by a DDoS attack profiler, a plurality of DDoS attack properties for the DDoS attack, wherein the DDoS attack utilizes an Internet of Things ("IoT") device operating in communication with the home gateway system,
creating, by the DDoS attack profiler, based upon the DDoS properties, a DDoS attack profile for the DDoS attack, wherein the DDoS attack profile comprises a source rotation property that indicates if the DDoS attack used one set of bots during the DDoS attack or changed from the one set of bots to another set of bots during the DDoS attack,
providing, by the DDoS attack profiler, a DDoS attack report to a correlator, wherein the DDoS attack report is based upon the DDoS attack profile,
determining, by an IoT device profiler, a plurality of IoT device properties for the IoT device,
creating, by the IoT device profiler, based upon the plurality of IoT device properties, an IoT device profile for the IoT device,
providing, by the IoT device profiler, an anomaly report to an anomalies repository, wherein the anomaly report identifies an anomaly associated with the IoT device based upon the IoT device profile,
receiving, by the correlator, the DDoS attack report from the DDoS attack profiler and the anomaly report from the anomalies repository,
correlating, by the correlator, the DDoS attack report with the anomaly report to determine if a match exists, and
in response to determining that the match exists, storing a bot match record in a bot match repository.

2. The home gateway system of claim 1, wherein the plurality of DDoS attack properties further comprises a volume property, a time/duration property, a packet type property, a profiling method property, and a devices in use property.

3. The home gateway system of claim 1, wherein the plurality of IoT device properties comprises an average data volume property, a daily patterns property, and a protocols in use property.

4. The home gateway system of claim 3, wherein the anomaly associated with the IoT device is indicative of an abnormality among at least one of the plurality of IoT device properties.

5. The home gateway system of claim 4, wherein the operations further comprise:
observing, by the IoT device profiler, a maintenance event; and
updating, by the IoT device profiler, the IoT device profile based upon the maintenance event.

6. The home gateway system of claim 1, wherein the operations further comprise providing a bot match report to a bot report aggregator, and wherein the bot match report comprises at least the bot match record.

7. A method comprising:
in response to a distributed denial of service ("DDoS") attack, determining, by a DDoS attack profiler executed by a home gateway system, a plurality of DDoS attack properties for the DDoS attack, wherein the DDoS attack utilizes an Internet of Things ("IoT") device operating in communication with the home gateway system;

creating, by the DDoS attack profiler executed by the home gateway system, based upon the DDoS properties, a DDoS attack profile for the DDoS attack, wherein the DDoS attack profile comprises a source rotation property that indicates if the DDoS attack used one set of bots during the DDoS attack or changed from the one set of bots to another set of bots during the DDoS attack;

providing, by the DDoS attack profiler executed by the home gateway system, a DDoS attack report to a correlator executed by the home gateway system, wherein the DDoS attack report is based upon the DDoS attack profile;

determining, by an IoT device profiler executed by the home gateway system, a plurality of IoT device properties for the IoT device;

creating, by the IoT device profiler executed by the home gateway system, based upon the plurality of IoT device properties, an IoT device profile for the IoT device;

providing, by the IoT device profiler executed by the home gateway system, an anomaly report to an anomalies repository, wherein the anomaly report identifies an anomaly associated with the IoT device based upon the IoT device profile;

receiving, by the correlator executed by the home gateway system, the DDoS attack report from the DDoS attack profiler and the anomaly report from the anomalies repository;

correlating, by the correlator executed by the home gateway system, the DDoS attack report with the anomaly report to determine if a match exists; and in response to determining that the match exists, storing a bot match record in a bot match repository.

8. The method of claim 7, wherein the plurality of DDoS attack properties further comprises a volume property, a time/duration property, a packet type property, a profiling method property, and a devices in use property.

9. The method of claim 7, wherein the plurality of IoT device properties comprises an average data volume property, a daily patterns property, and a protocols in use property.

10. The method of claim 9, wherein the anomaly associated with the IoT device is indicative of an abnormality among at least one of the plurality of IoT device properties.

11. The method of claim 10, further comprising:
observing, by the IoT device profiler executed by the home gateway system, a maintenance event; and
updating, by the IoT device profiler executed by the home gateway system, the IoT device profile based upon the maintenance event.

12. The method of claim 7, further comprising providing a bot match report to a bot report aggregator, wherein the bot match report comprises at least the bot match record.

13. The method of claim 12, further comprising aggregating, by the bot report aggregator, the bot match report from the bot match repository associated with the home gateway system and a plurality of bot match reports from a plurality of bot match repositories associated with a plurality of home gateways.

14. The method of claim 13, further comprising tracking, by the bot report aggregator, a plurality of DDoS attacks comprising the DDoS attack based, at least in part, upon the bot match report and the plurality of bot match reports.

15. The method of claim 14, further comprising identifying, by the bot report aggregator, a shared set of bots that participated in different DDoS attacks of the plurality of DDoS attacks.

16. A computer-readable storage medium comprising computer-executable instructions that, when executed by a processor, cause the processor to perform operations comprising:

in response to a distributed denial of service ("DDoS") attack, determining, by a DDoS attack profiler, a plurality of DDoS attack properties for the DDoS attack, wherein the DDoS attack utilizes an Internet of Things ("IoT") device operating in communication with a home gateway system;

creating, by the DDoS attack profiler, based upon the DDoS properties, a DDoS attack profile for the DDoS attack, wherein the DDoS attack profile comprises a source rotation property that indicates if the DDoS attack used one set of bots during the DDoS attack or changed from the one set of bots to another set of bots during the DDoS attack;

providing, by the DDoS attack profiler, a DDoS attack report to a correlator, wherein the DDoS attack report is based upon the DDoS attack profile;

determining, by an IoT device profiler, a plurality of IoT device properties for the IoT device;

creating, by the IoT device profiler, based upon the plurality of IoT device properties, an IoT device profile for the IoT device;

providing, by the IoT device profiler, an anomaly report to an anomalies repository, wherein the anomaly report identifies an anomaly associated with the IoT device based upon the IoT device profile;

receiving, by the correlator, the DDoS attack report from the DDoS attack profiler and the anomaly report from the anomalies repository;

correlating, by the correlator, the DDoS attack report with the anomaly report to determine if a match exists; and in response to determining that the match exists, storing a bot match record in a bot match repository.

17. The computer-readable storage medium of claim 16, wherein the plurality of DDoS attack properties further comprises a volume property, a time/duration property, a packet type property, a profiling method property, and a devices in use property.

18. The computer-readable storage medium of claim 16, wherein the plurality of IoT device properties comprises an average data volume property, a daily patterns property, and a protocols in use property.

19. The computer-readable storage medium of claim 18, wherein the anomaly associated with the IoT device is indicative of an abnormality among at least one of the plurality of IoT device properties.

20. The computer-readable storage medium of claim 16, wherein the operations further comprise providing a bot match report to a bot report aggregator, and wherein the bot match report comprises at least the bot match record.

* * * * *